Patented Jan. 30, 1934

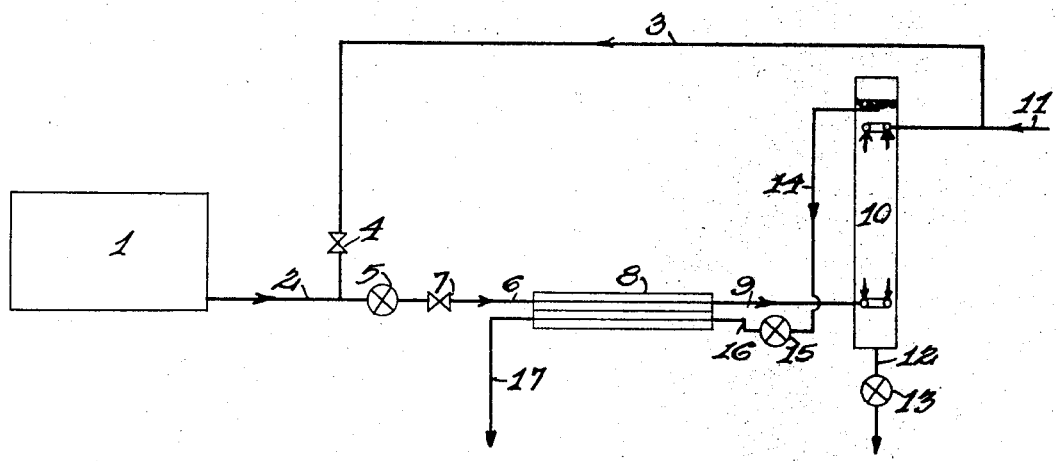

1,945,500

UNITED STATES PATENT OFFICE

1,945,500

METHOD OF TREATING LUBRICATING OIL STOCKS WITH LIQUID SULPHUR DIOXIDE

Wolfgang Grote, Berlin-Wilmersdorf, Germany, and Paul Obergfell, New York, N. Y., assignors to Edeleanu Gesellschaft m. b. H., a corporation of Germany Application October 20, 1932, Serial No. 638,814, and in Germany October 29, 1931

12 Claims. (Cl. 196—37)

Our invention relates to an improvement in the process of refining petroleum lubricating oil stocks and the like by extraction with liquid-$SO_2$, including mixed-solvents containing liquid-$SO_2$.

So far, it has not been possible in the liquid sulphur dioxide (Edeleanu) process to treat lubricating oil stocks of high viscosity satisfactorily in the vertical counter-current mixing tower conventionally used in the treatment of lighter oils. By "high viscosity lubricating oil stocks" we mean in this connection oils having a Saybolt viscosity above 300 seconds at 100° F. Due to the relatively high viscosity of such lubricating oils it has heretofore been necessary to use a number of mixing vessels with agitators, combined with settling tanks, in order to obtain an adequate mixing with liquid sulphur dioxide and, thereby, a satisfactory extraction at the temperatures ordinarily employed (14° F.–35° F.). See, for example, the patent to Edeleanu et al, No. 1,666,560, issued April 17, 1928. This so-called mixing-settling apparatus had the disadvantage of increasing the cost of equipment and the space required for the whole plant.

The present invention deals with a new method whereby heavy high viscosity lubricating oil stocks may be treated with liquid sulphur dioxide in the conventional type of counter-current mixing tower, hitherto used only on lighter oils. This is done by diluting the oil under treatment with a certain amount of liquid sulphur dioxide prior to passing the oil through the counter-current treating tower, and preferably even before the heat exchanger cooling apparatus, dilution being more easily effected before the oil is cooled. The liquid sulphur dioxide must be added in a quantity sufficient to effect a considerable reduction of the viscosity of the oil. If this is done, the following extraction in the counter-current mixing tower does not offer any difficulties and gives very satisfactory results. Another advantage of reducing the viscosity of the oil by dilution before cooling is that a much better effect is obtained in the heat exchangers and/or in the cooling equipment through which the oil passes before entering the mixer. The size of the heat exchangers and cooling equipment may, therefore, be greatly reduced below their present standard.

The attached drawing gives an example of how the invention may be carried out. In the drawing lubricating oil to be treated with liquid sulphur dioxide may be contained in a tank (1). The oil is led by suction pipe line (2) to pump (5). Before the pump, a pipe line (3) with regulating valve (4) enters into pipe line (2) by which liquid sulphur dioxide is injected into the oil pipe line. Pump (5) which may be a centrifugal pump specially manufactured for the mixing of the two liquids mixes the sulphur dioxide thoroughly with the oil and presses the resulting oil sulphur dioxide solution through pipe line (6) with valve (7) to heat exchanger (8), where the mixture is cooled by the refined oil coming from the mixer. Pipe line (9) leads the mixture to the counter-current mixing tower (10). At the upper end of the tower cold liquid sulphur dioxide enters through pipe line (11). Pipe line (3) branches off this pipe line which, as described above, enters into suction pipe line (2) of pump (5). In the mixer (10) oil and sulphur dioxide flow against each other; the resulting extract solution leaves the mixer continuously by pipe line (12) and is pressed into the extract evaporator group by pump (13). On the other hand the lighter raffinate solution leaves the mixer by pipe line (14) at its upper end and is pressed by pump (15) through pipe line (16) into the heat exchanger (8), where it enters into heat exchange with the warm oil sulphur dioxide solution which is pressed into the mixer by pump (5). Pipe line (17) then takes the preheated raffinate solution to the raffinate evaporator group.

The amount of $SO_2$ to be used in diluting the oil, to reduce its viscosity prior to extraction, will depend upon the particular oil and can easily be determined by trial in any given case. On the average, from 15–25% by weight will be found necessary to reduce the viscosity sufficiently to permit of efficient and satisfactory extraction in the counter-current mixing tower. In the case of highly viscous oils, particularly those having a high wax content and high pour point, a greater amount of $SO_2$ should be used.

Satisfactory extraction in a counter-current mixing tower cannot be obtained if the oil which enters has a viscosity much greater than about 300° Saybolt at 100° F.

The effect of different percentages of SO₂ upon the viscosity of a particular lubricating oil distillate is illustrated in the following table. In the case of this oil about 20% SO₂ would preferably be used as the diluent.

| Percent by weight of SO₂ | Saybolt viscosity at 20° C. |
|---|---|
| No dilution. 0 | 983 |
| 8 | 336 |
| 16 | 170 |
| 22.5 | 100 |

The preferred upper limit of SO₂ used for dilution is fixed by the percentage of SO₂ which is completely miscible in the oil, since the purpose of the dilution is to reduce the viscosity of the oil and not to effect a pre-extraction. In fact a decrease of efficiency of the extraction will result if an excess of SO₂ is used which results in the formation of an extract phase or layer prior to the counter-current mixing in which the true extraction step occurs. This means that the amount of SO₂ used for dilution should not exceed that which is completely soluble in the oil at the extraction mixing temperature—that is, the temperature of the diluted oil when it enters the counter-current mixing tower. The actual value of this upper limit will of course depend upon the particular oil. Instead of a mixing pump, as shown in the drawing, the mixing may also be effected by any other device. Furthermore, the nature of the invention is not changed if the sulphur dioxide is led into the oil in gaseous condition instead of in liquid condition and diluted in it. Finally, this invention may also be used in processes where mixtures of SO₂ and benzene, or other sulphur dioxide containing mixed solvents are used as refining agents instead of straight liquid sulphur dioxide. In such cases the dilution may be effected either with straight liquid sulphur dioxide, or with the corresponding mixed solvent.

With certain exceptionally viscous and waxy stocks, even after the oil has been diluted the maximum amount it may still be of too great viscosity at the extraction temperature to permit of efficient or satisfactory extraction in a counter-current mixing tower. In this case it will be necessary to use a combination of mixing and settling tanks, such as described in the patent to Edeleanu et al, No. 1,666,560, issued April 17, 1928. Dilution will, however, still be of the utmost value in facilitating the cooling and mixing.

In the claims it will be understood that by "extracting in a single counter-current zone" is meant extracting in a counter-current mixing tower as distinguished from extracting in a combination of mixing and settling tanks.

After having set forth in the above the idea of our invention and its method of operation, we claim:

1. The process of refining high viscosity petroleum lubricating oil stocks with liquid-SO₂ comprising diluting the uncooled unextracted stock with SO₂ in amount substantially miscible with the stock at the extraction mixing temperature and sufficient to cause a decrease in viscosity to permit of efficient and satisfactory cooling and single-zone counter-current extraction, cooling the diluted stock to the desired extraction mixing temperature, and extracting with liquid-SO₂ in a single counter-current zone.

2. The process of refining high viscosity petroleum lubricating oil stocks with liquid-SO₂ comprising diluting the uncooled unextracted stock with liquid-SO₂ in amount substantially miscible with the stock at the extraction mixing temperature and sufficient to cause a decrease in viscosity to permit of efficient and satisfactory cooling and single-zone counter-current extraction, cooling the diluted stock to the desired extraction mixing temperature, and extracting with liquid-SO₂ in a single counter-current zone.

3. The process of refining high viscosity petroleum lubricating oil stocks with liquid-SO₂-containing mixed-solvents comprising diluting the uncooled unextracted stock with the liquid-SO₂-containing mixed-solvent in amount substantially miscible with the stock at the extraction mixing temperature and sufficient to cause a decrease in viscosity to permit of efficient and satisfactory cooling and single-zone counter-current extraction, cooling the diluted stock to the desired extraction mixing temperature, and extracting with an additional amount of the liquid-SO₂-containing mixed-solvent in a single counter-current zone.

4. The process of refining high viscosity petroleum lubricating oil stocks with liquid-SO₂-containing mixed-solvents comprising diluting the uncooled unextracted stock with liquid-SO₂ in amount substantially miscible with the stock at the extraction mixing temperature and sufficient to cause a decrease in viscosity to permit of efficient and satisfactory cooling and single-zone counter-current extraction, cooling the diluted stock to the desired extraction mixing temperature, and extracting with the liquid-SO₂-containing mixed-solvent in a single counter-current zone.

5. In the process of refining high viscosity petroleum lubricating oil stocks by extracting undesirable constituents with liquid-SO₂, the step prior to extraction comprising diluting the stock with SO₂ in amount about but not substantially greater than the maximum amount completely miscible with the stock at the extraction mixing temperature.

6. In the process of refining high viscosity petroleum lubricating oil stocks by extracting undesirable constituents with liquid-SO₂, the step prior to extraction comprising diluting the stock with liquid-SO₂ in amount about but not substantially greater than the maximum amount completely miscible with the stock at the extraction mixing temperature.

7. In the process of refining high viscosity petroleum lubricating oil stocks by extracting undesirable constituents with liquid-SO₂-containing mixed-solvents, the step prior to extraction comprising diluting the stock with the liquid-SO₂-containing mixed-solvent in amount about but not substantially greater than the maximum amount completely miscible with the stock at the extraction mixing temperature.

8. In the process of refining high viscosity petroleum lubricating oil stocks by extracting undesirable constituents with liquid-SO₂-containing mixed-solvents, the step prior to extraction comprising diluting the stock with liquid-SO₂ in amount about but not substantially greater than the maximum amount completely miscible with the stock at the extraction mixing temperature.

9. The process according to claim 5 in which uncooled stock is diluted and subsequently cooled to the desired extraction mixing temperature.

10. The process according to claim 6 in which uncooled stock is diluted and subsequently cooled to the desired extraction mixing temperature.

11. The process according to claim 7 in which uncooled stock is diluted and subsequently cooled to the desired extraction mixing temperature.

12. The process according to claim 8 in which uncooled stock is diluted and subsequently cooled to the desired extraction mixing temperature.

WOLFGANG GROTE.
PAUL OBERGFELL.